United States Patent [19]

Shanks, II

[11] 4,068,865
[45] Jan. 17, 1978

[54] PIPE CONNECTORS

[75] Inventor: Forrest E. Shanks, II, Farmers Branch, Tex.

[73] Assignee: Vetco Offshore, Inc., Ventura, Calif.

[21] Appl. No.: 709,274

[22] Filed: July 28, 1976

Related U.S. Application Data

[63] Continuation-in-part of Ser. No. 644,719, Dec. 29, 1975, abandoned.

[51] Int. Cl.² ............................................. F16L 21/00
[52] U.S. Cl. .................................... 285/90; 285/115; 285/309; 285/356
[58] Field of Search ................ 285/90, 404, 309, 310, 285/308, 421, 338, 356, 348, 115

[56] References Cited

U.S. PATENT DOCUMENTS

| 1,973,809 | 9/1934 | Heggem | 285/309 X |
| 2,472,425 | 6/1949 | Howard | 285/356 X |
| 2,523,874 | 9/1950 | Moore | 285/356 X |
| 3,494,638 | 2/1970 | Todd et al. | 285/356 X |
| 3,606,393 | 9/1971 | Huntsinger et al. | 285/308 X |
| 3,827,728 | 8/1974 | Hynes | 285/309 X |

FOREIGN PATENT DOCUMENTS

| 328,115 | 7/1935 | Italy | 285/404 |
| 453,217 | 3/1936 | United Kingdom | 285/343 |

*Primary Examiner*—Thomas F. Callaghan
*Attorney, Agent, or Firm*—Subkow and Kriegel

[57] ABSTRACT

Pipe connectors particularly useful in securing sections of an underwater marine riser together, including a pin received in a box and bearing against a box shoulder, the pin and box being secured together by coengaging members mounted on the box, and between the pin and box, and forced against a shoulder at the outer portion of the pin over substantially 360° of the shoulder, to correspondingly force the outer end of the pin against the box shoulder, with the contacting pin and box surfaces axially preloaded against each other. The coengaging members can include a plurality of lock dogs mounted in the box and movable radially inwardly against a ring device disposed between the box and pin and engaging the shoulder at the outer portion of the pin, the dogs and pin device having coengaging cam surfaces causing dogs to exert an axial thrust on the ring device which is transmitted from the ring device to the pin shoulder. Bending forces imposed on the connector are transmitted between the box and pin without subjecting the lock dogs to such forces. In another embodiment of the invention, the coengaging members include a ring threaded on the box member and engaging a spacer ring which in turn engages a segmental ring contacting the pin shoulder, rotation of the threaded ring shifting the spacer and segmented rings axially to pre-load the pin and against the box shoulder.

23 Claims, 10 Drawing Figures

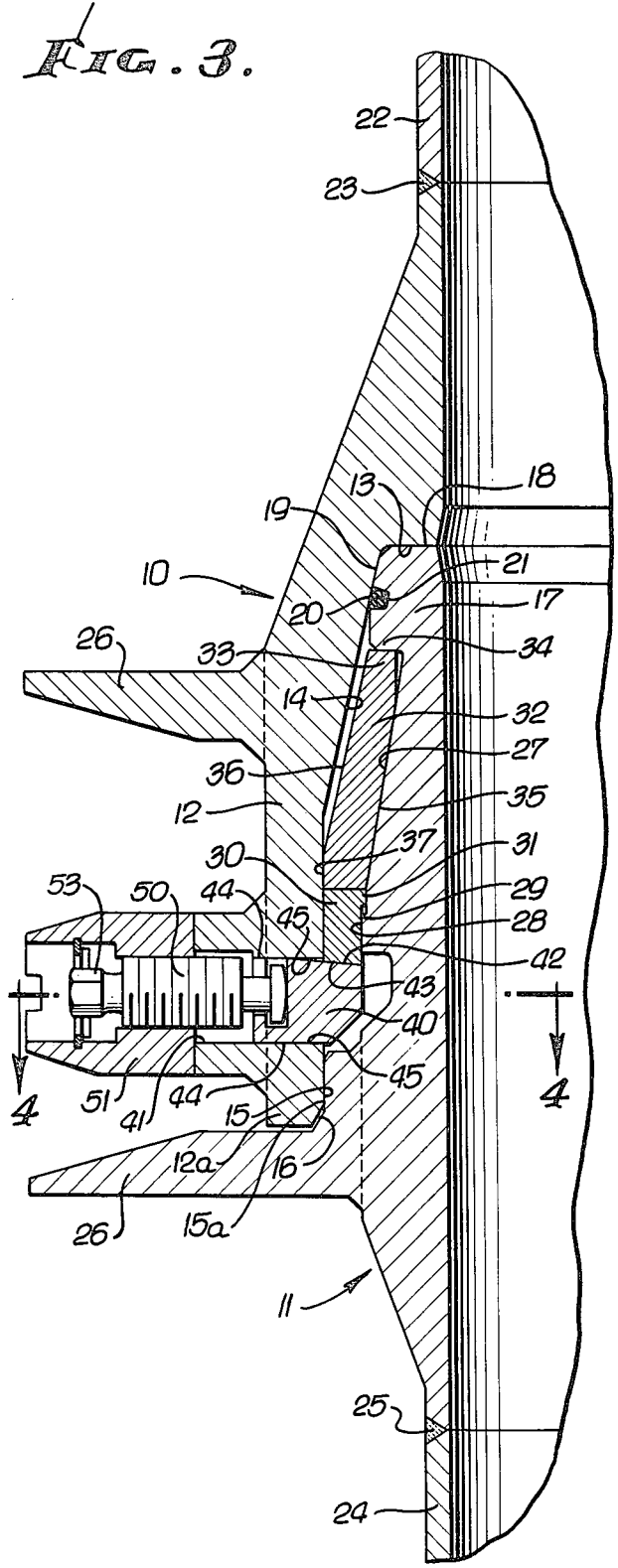
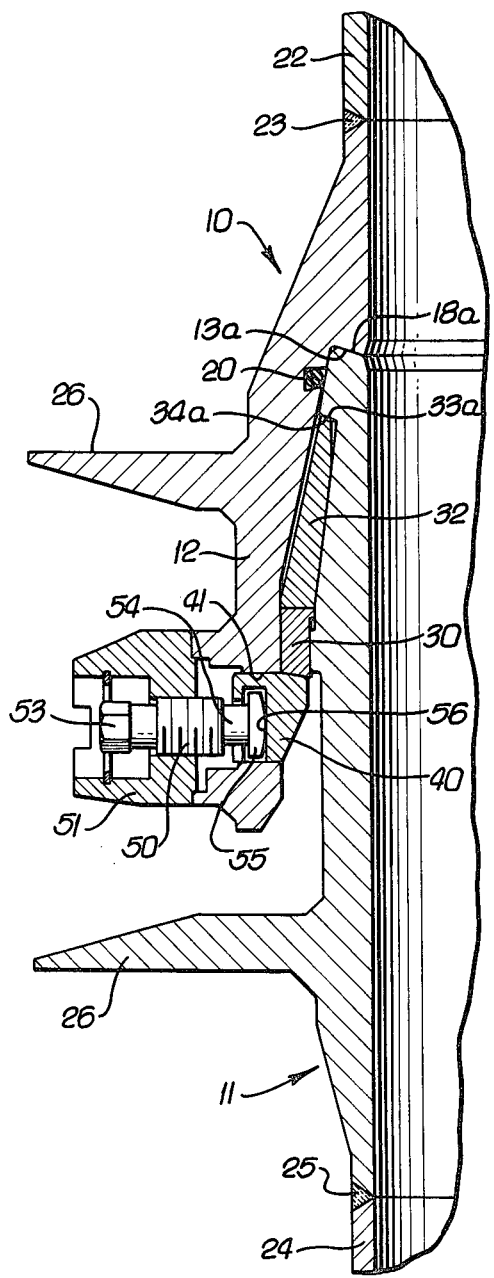

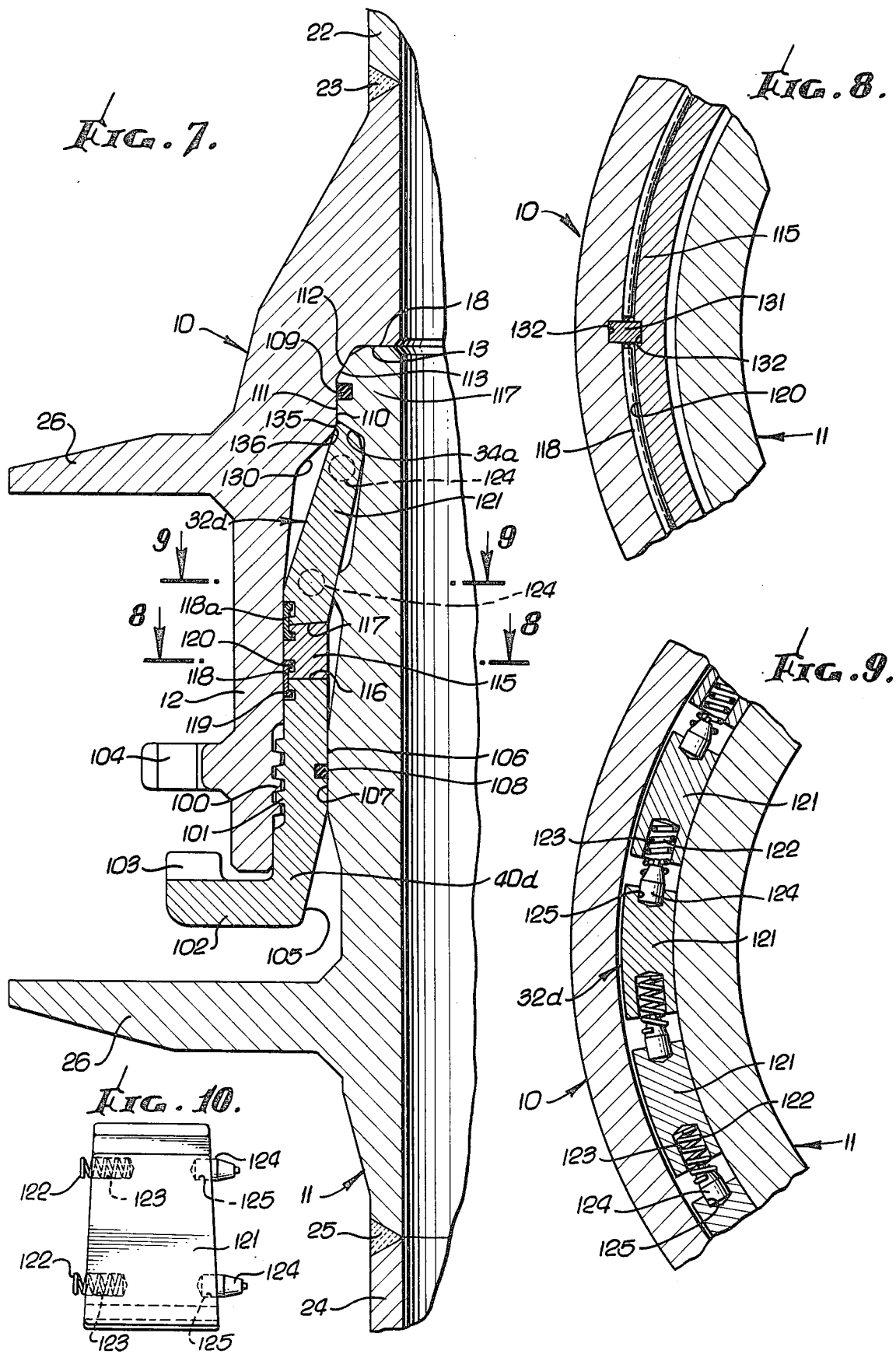

PIPE CONNECTORS

The present application is a continuation-in-part of my application for "Pipe Connectors", Ser. No. 644,719, filed Dec. 29, 1975, and now abandoned.

The present invention relates to connectors, and more particularly to connectors for securing adjacent pipe sections together, such as those forming parts of marine risers used in drilling operations.

In the performance of subsea oil and gas well drilling operations, a tubular conduit, commonly referred to as a marine riser, is provided that extends from a region adjacent to the subsea floor to a drilling vessel or platform at the surface of the water. Typically, the conduit will extend upwardly from a position adjacent the top of a subsea blowout preventer stack. The conduit is formed by joining together suitable lengths of pipe through the agency of intervening connectors, a portion of the conduit typically including a telescopic joint and one or more flex joints, as well as accessory equipment.

A connector used for securing sections of marine riser conduit together is illustrated in United States Pat. No. 3,606,393, in which the pin and box of a connector are secured together through an intervening lock, leakage of fluid between the pin and box being prevented by one or more suitable elastomer side seals. Although pipe connectors as illustrated in this patent have operated successfully, under certain conditions the pin and box portions of the connector do not remain rigidly secured to one another, but tend to become loose or released under relatively large tensile loads or under large bending loads, as well as under a combination of both large bending and tensile loads applied simultaneously. This undesired action will increase as marine risers become used in relatively deep water, as, for example, in water depths exceeding 5,000 feet. The marine riser becomes heavier with increased vertical lengths, slower to run into place, and to remove from its location with attendant hazards.

Another specific connector for securing sections of a marine riser conduit together is illustrated in U.S. Pat. No. 3,827,728, in which the pin and box of the connector are secured together by a plurality of locks or dogs mounted in the box, which have tapered or cam surfaces engaging companion surfaces of the pin, inward shifting of the dogs forcing the pin further into the box and pressing its outer end into engagement with a companion shoulder in the box. While this connector represents a material improvement over the connector disclosed in U.S. Pat. No. 3,696,393, it produces high stress concentrations on the pin due to the spaced, limited areas of contact of the dogs on the pin, resulting in fatigue failure.

With the present invention, a connector is provided in which the high stress concentrations of the dogs on the pin do not occur, since tensile loads imposed on the dogs are not transmitted from the dogs directly to the pin, but from the dogs to the pin through an intermediate device that bears against the pin across a substantially 360° contact area. Moreover, bending forces imposed on the connector are not transmitted through the dogs. Instead, they bypass the dogs, being transmitted directly between the pin and box or between the pin and box through an intervening member, which make large areas of contact with the the pin and box around their full circumferences. As a result, a connector is provided which is as strong as the pipe to which it is connected, and in which failures from fatigue are eliminated, or at the very least reduced considerably.

The present invention further contemplates a connector in which a pre-load is imposed in the connector through substantially a 360° region of contact between the transverse surfaces of the pin and box, the pre-load being provided as a result of rotating a member threaded in the box to effect its axial movement along the box and corresponding axial shifting of a segmented ring engaging the pin to force the end of the pin against the box shoulder.

This invention possesses many other advantages, and has other purposes which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not be taken in a limiting sense.

Referring to the drawings:

FIG. 3 is an enlarged fragmentary vertical section taken along the line 3—3 on FIG. 1;

FIG. 5 is a view similar to FIG. 3 of a modified form of the invention;

FIG. 7 is a view similar to FIG. 3 of a further modification of the invention;

FIG. 8 is fragmentary section taken along the line 8—8 on FIG. 7;

FIG. 9 is a fragmentary section taken along line 9—9 on FIG. 7; and

FIG. 10 is a side elevation of one of the segments of the modification described in FIGS. 7 to 9.

Figure 1:
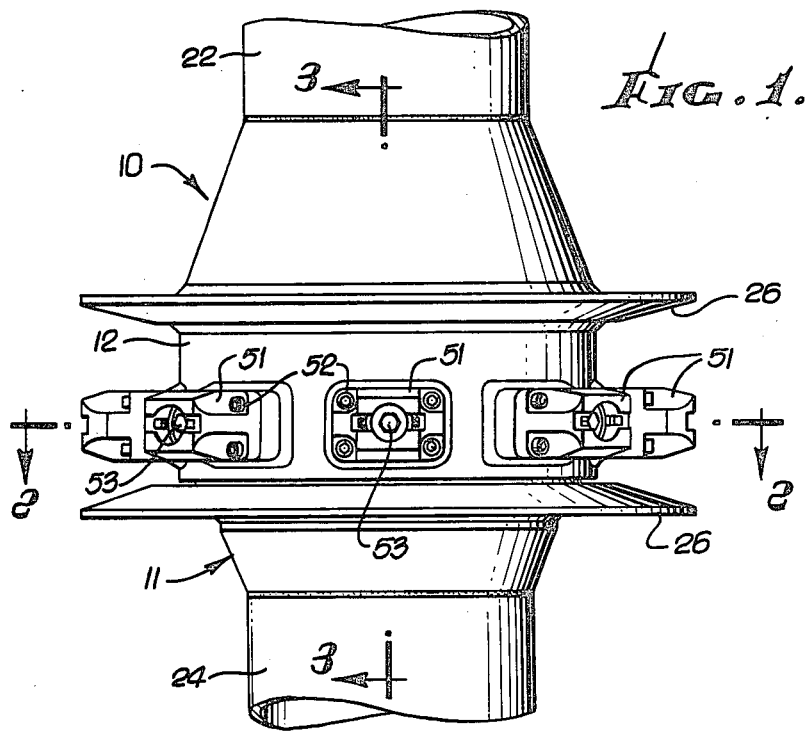
FIG. 1 is a side elevational view of a connector embodying the invention.
Figure 2:
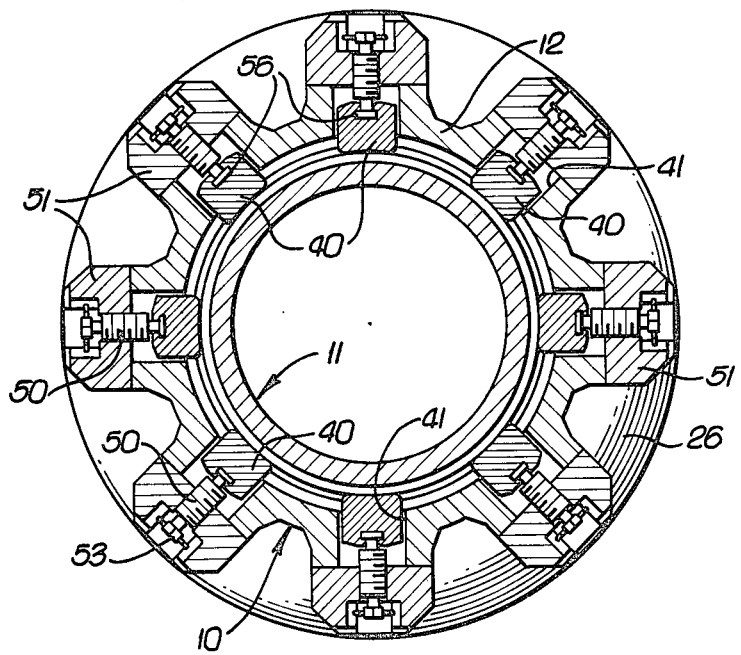
FIG. 2 is an enlarged cross-section taken along the line 2—2 on FIG. 1.

As illustrated in the drawings, marine risers R are provided that include a box 10 adapted to be telescoped over a companion pin 11. The box includes a skirt portion 12 and a downwardly facing shoulder 13 normal to its axis. An upwardly tapering inner wall 14 is provided in the skirt, extending downwardly from the box shoulder 13, which terminates in a lower cylindrical inner wall 15 ending at a flaring mouth 16 of the box skirt.

The pin extends upwardly into the box, the upper end portion 17 of the pin having its terminal surface 18 normal to the axis of the connector and bearing against the downwardly facing box shoulder 13. The upper pin portion 17 has a tapered external wall 19 companion to the tapered inner wall 14 and contiguous such inner wall when the pin surface 18 is engaging the box shoulder 13. Leakage of fluid between the interior and exterior of the connector is prevented by a suitable side seal ring 20, such as an O-ring, disposed in a groove 21 in the pin and bearing against the upper portion of the tapered inner wall 14.

As disclosed in the drawings, the upper end of the box 10 is connected to an upper conduit section 22 by a suitable weld 23 extending circumferentially therearound. Similarly, the lower end of the pin 10 is secured to a lower adapter or pipe section 24 by a circumferentially continuous weld 25 extending therearound. As illustrated, the box and pin have longitudinally spaced upper and lower horizontal flanges 26 through which one or more choke kill lines (not shown) may extend along the exterior of the marine riser.

The pin has a tapered external wall 27 below its upper portion 17 which is spaced laterally inwardly from the tapered inner wall 14 of the box. The pin external wall terminates at a cylindrical external wall 28 therebelow which has an upwardly facing shoulder 29 at its upper end, the cylindrical external surface being laterally spaced from the inner cylindrical surface 15 of the box. A circumferentially continuous or solid load ring 30 is mounted in the circumferential space between the box and pin, the inner and outer surfaces of the load ring being closely adjacent to the companion outer and inner cylindrical surfaces 15, 28 on the pin and box, the load ring having an inwardly directed flange 31 adapted to rest upon the upwardly facing pin shoulder 29.

A spacer ring 32 is supported on the load ring 30, with the upper end 33 of the spacer ring being engageable with a downwardly facing pin shoulder 34 over substantially 360°, the pin shoulder 34 and the upper end 33 of the spacer ring being normal to the axis of the connector. The spacer ring has an internal tapered surface 35 corresponding to the external tapered surface 27 on the pin below the pin shoulder 34, and also an external tapered surface 36 corresponding in inclination to the taper of the inner box wall 14. The lower external portion of the spacer ring has an external cylindrical surface 37 conforming to the internal cylindrical surface 15 on the box. This spacer ring may be split or formed in two or more parts suitably secured together, so as to facilitate mounting of the spacer ring 32 in the position disclosed in the drawings and under the pin shoulder 34.

In assembling the spacer ring 32 and solid load ring 30, the latter is first mounted over the upper pin portion 17, its flange 31 resting upon the pin shoulder 29. Such assembly can, of course, occur since the minimum inside diameter of the load ring is slightly greater than the maximum diameter of the upper portion 17 at the pin shoulder 34. The split spacer ring 32 is then mounted in place above the load ring, resting upon the latter and with its upper end 33 positioned below the pin shoulder 34.

The pin 11 and box 10 are secured together against longitudinal relative movement by a plurality of circumferentially spaced horizontal lock members or dogs 40 disposed in openings or windows 41 in the box member and adapted to be shifted inwardly to dispose upper tapered or cam surfaces 42 on the inner portions of the dogs against companion tapered surfaces 43 at the lower end of the load ring 30, these surfaces being inclined in an inward and downward direction. Inward shifting of the dogs 40 causes the cam surfaces to engage the companion surfaces on the solid load ring 30 to force the latter and also the split spacer ring 32 upwardly to engage the upper end 33 of the spacer ring with the pin shoulder 34 and force the upper terminal surface 18 of the pin against the downwardly facing box shoulder 13. The dogs are circumferentially spaced from one another, being of a suitable number, such as the eight illustrated in the drawings, each dog being of substantial arcuate extent and having top and bottom flat parallel surfaces 44 adapted to move radially within its window 41 in engagement with companion top and bottom guide surfaces 45 of the window.

Each dog is adapted to occupy a completely retracted or outward position, in which its inner end is disposed entirely within the confines of the window 41.

Figure 4:
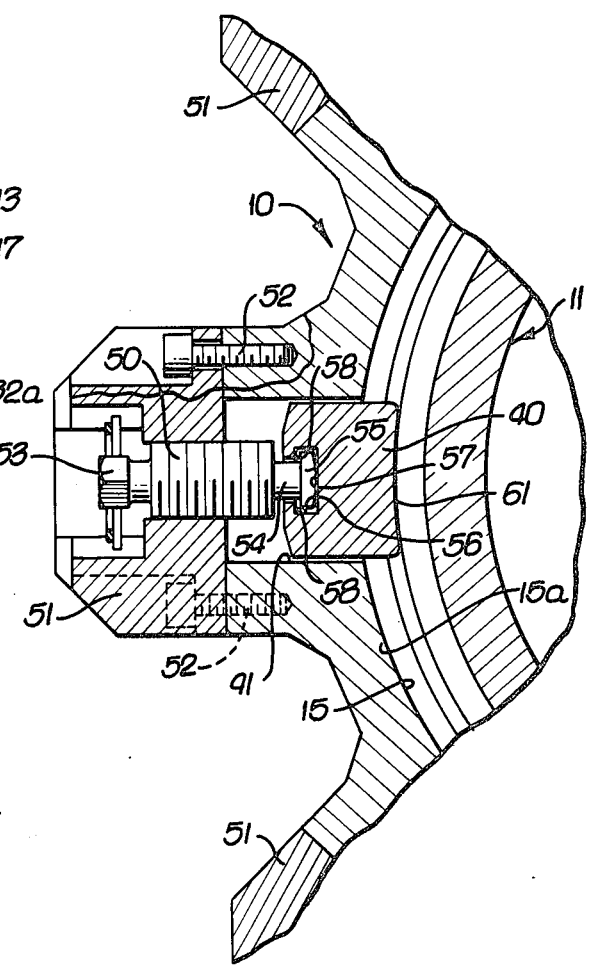
FIG. 4 is a cross-section taken along the line 4—4 on FIG. 3.

The dog can be shifted radially inwardly to cause its cam surface 42 to move under and into engagement with the companion cam surface 43 of the load ring 30. Such inward and also outward movement of each dog is secured by means of a screw 50 threaded into a box 51 suitably secured to the box member 10, as by means of screws 52 (FIG. 4). The screw has an outer head 53 to which a suitable wrench (not shown) can be applied for rotating the screw in both directions, this screw possessing a smaller diameter shank portion 54 terminating in an inner thrust head 55.

In assembling the screw to the dog 40, the shank 54 can be moved downwardly within a T-shaped slot 56 in the outer portion of each lock dog 40, the larger diameter thrust head 55 moving downwardly within this slot with its outer margin received within the outer or larger portion of the T-shaped slot, the thrust head of the screw being adapted to bear inwardly against the base 57 of the larger slot, and the outer margins of the head being adapted to engage the opposed outer rim portions 58 of the dog, for the purpose of shifting the dog outwardly when the pin and box are to be released from one another.

After assembling the screw and dog together, the screw is inserted from the interior of the box through its window 41, the screw then being turned in the appropriate direction, as to the left, to thread its screw portion within the companion threaded bore 60 in the box 51, the outward threading being continued until the lock dog 40 moves completely inwardly of the inner cylindrical wall 15 of the box. After all of the lock dogs and screws have been assembled within the box and shifted to their extreme outward positions, the box 10 can be disposed over the pin 11 and each screw 50 then rotated in the appropriate direction, as to the right, to force the lock dogs 40 under and into engagement with the lower end 43 of the load ring 30. It is to be noted that the inner portion 61 of each dog is curved to conform to the curvature of the pin.

The cam surfaces 42, 43 are disposed at an angle to a plane normal to the common axis of the pin and box, such that rotation of the screws 50 to force the dogs 40 inwardly will shift the load ring 30 and split spacer ring 32 upwardly. Continued rotation and actuation of the screws will cause the lock ring and spacer ring to move upwardly until the spacer ring engages the pin shoulder 34, whereupon the pin will be moved upwardly within the box member until its upper end 18 engages the downwardly facing box shoulder 13. Continued application of torque to the screws will further shift the dogs inwardly and will apply a compressive load to the load ring 30 and spacer ring 32 to force the upper pin portion against the downwardly facing box shoulder 13 until a desired preload exists between the dogs and the downwardly facing box shoulder.

It is to be noted that tensile loads transmitted between the box and pin pass from the dogs 40 through the load ring 30 and the spacer ring 32 to the pin shoulder 34, none of such tensile loading being transmitted directly from the dogs to the pin 11. As a result, the transmission of the tensile loads to the pin occurs over substantially the entire circumferential extent of the pin shoulder 34, such loads being distributed uniformly around the entire pin shoulder circumference. This is to be distinguished from prior circumferentially spaced lock members or dogs which engaged the pin directly, and which, therefore, concentrate the tensile load being transmitted between the box and pin to comparatively short, circumferentially spaced areas of the pin. This results in high stress concentrations at the points of engagement between the dogs and pin, and often results in fatigue failure of the pin of the riser connector.

It is further to be noted that bending forces are not transmitted to any material extent through the dogs 40. Instead, the bending forces pass between the upper portion of the tapered inner wall 14 of the box and the opposed tapered surface 19 of the upper portion 17 of the pin, and also from the cylindrical inner wall 15 of the box below the dogs to the cylindrical periphery 15a of the pin. In addition, the bending forces are transmitted from the cylindrical inner surface 15 of the box above the dogs through the load ring 30 to the cylindrical periphery 28 of the pin. Accordingly, bending stresses are not taken through the preloaded dogs 40, which would otherwise be transmitted to the pin at concentrated points, thereby providing a source of fatigue failure.

In the form of invention disclosed in FIG. 5, substantially the same load ring 30 and spacer ring 32 arrangement is provided, except that the upper end 18a of the pin is disposed at a slight angle to a plane perpendicular to the connector axis, being inclined in a downward and inward direction. This upper pin terminal surface engages a companion inclined downwardly facing box shoulder 13a. Similarly, the upper end 33a of the spacer ring is disposed at a slight angle to a plane normal to the axis of the connector, the extent of inclination being in a downward and inward direction. The upper spacer ring terminal bears against a companion inclined pin shoulder 34a.

As disclosed in FIG. 5, the T-slot 56 of the dogs opens in a downward direction, but the relationship between the dogs and the actuating screws is otherwise the same as illustrated in FIGS. 1 to 4. The downward extension of the box skirt 12a to provide the cylindrical inner wall 15 for engagement with the cylindrical periphery 15a of the pin is not present in FIG. 5. However, the bending stresses are still transmitted from the box through the upper portion of the pin 17, and also from the cylindrical lower wall 15 of the box above the dogs through the load ring 30 to the opposed cylindrical periphery 28 of the pin, thereby precluding transmission of the bending forces through the dogs themselves.

Figure 6:
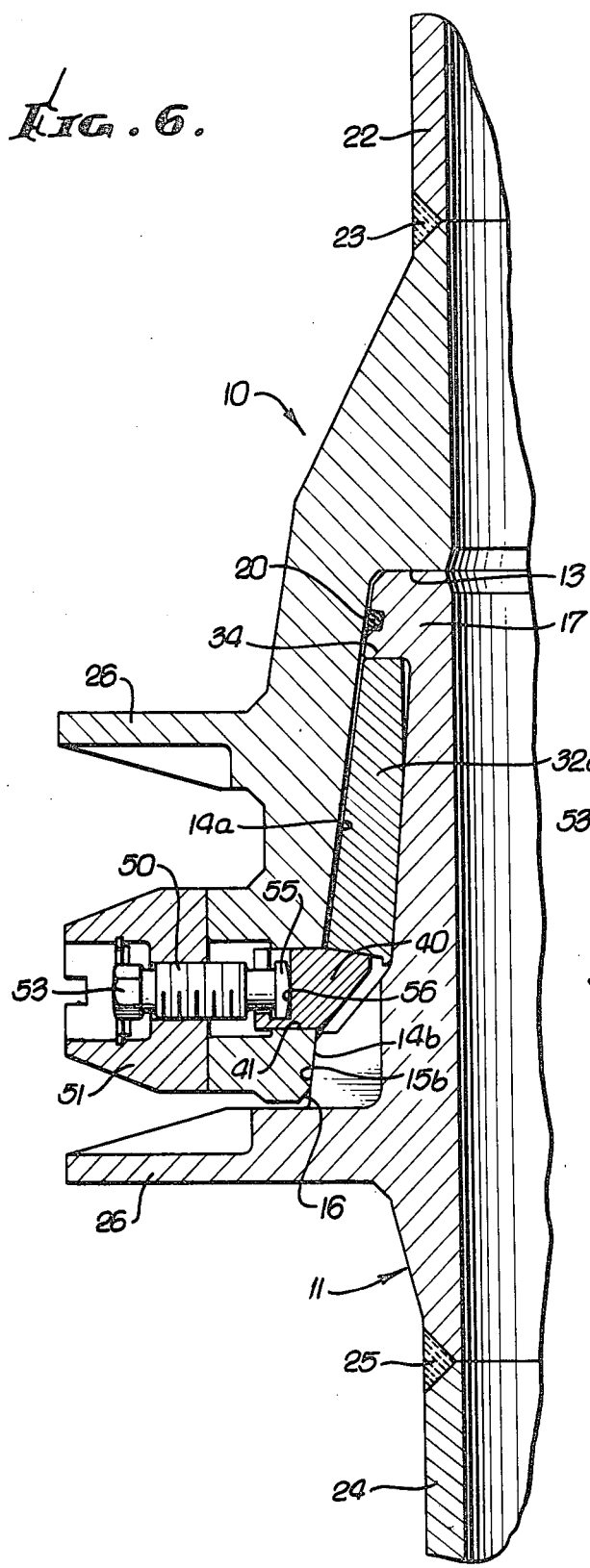
FIG. 6 is a view similar to FIGS. 3 and 5 of yet a further modification of the invention.

As disclosed in FIG. 6, the load and spacer ring have been combined in a single unit 32a. The same relationship exists between the actuating screw and the dogs as in the embodiment disclosed in FIGS. 1 to 4, inclusive. In lieu of a cylindrical lower surface being provided on the box skirt, the entire inner surface 14a of the box is inclined in a downward and outward direction from the box shoulder 13 to the flaring mouth 16 of the box, the combined load and spacer ring 32a being similarly inclined on its exterior. This load and spacer ring can be split to facilitate its mounting over the upper end portion 17 of the pin, or it may be composed of a plurality of segments that are readily moved laterally into position on the pin under the pin shoulder 34. The lower portion 14b of the tapered surface 14a of the box will engage the companion tapered surface 15b on the pin below the lock dogs 40, so that the bending loads are transmitted between the box adjacent to its shoulder 13 and the upper end 17 of the pin, as well as from the lower end of the box and the confronting surface 15b on the pin. Thus, the thrust load between the dogs 40 and the pin 11 are transmitted into the load and spacer ring 32a and then over substantially 360° of the pin to the pin shoulder 34. Similarly, the bending forces are transmitted from the box to the pin through the entire circumference of the upper portion 17 of the pin, as well as from substantially the entire lower circumference of the inner wall 14a of the box to substantially the entire circumference of the pin surface 15b.

In the form of invention illustrated in FIGS. 7 to 10, inclusive, a plurality of dogs is not provided, nor are the cam surfaces between such dogs and the load ring 30 utilized for applying the pre-load between the end 18 of the pin and the confronting shoulder 13 on the box 10. Instead, the box skirt 12 has an internal straight thread 100 therein which meshes with external threads 101 of a ring 40d disposed in the annular space between the box skirt 12 and the pin 11, the ring having a flange 102 extending laterally therefrom and which terminates in a plurality of lugs or reaction surfaces 103 confronting companion lugs or reaction surfaces 104 secured to or integral with the skirt portion 12 of the box.

The internal and external threads 100, 101 are straight threads, the ring 40d having a flaring mouth 105 which merges into an internal cylindrical surface 106 engaging an external surface 107 on the periphery of the pin 11. A suitable seal ring 108 on the threaded ring engages the external cylindrical surface 107 to prevent leakage between those parts. In a manner similar to the arrangement shown in the other embodiments, the upper pin portion 17 carries a seal ring 109 engaging an internal surface 110 on the box, except that such internal surface and the opposed external surface 111 of the upper pin portion are cylindrical. Above the seal ring 109, the upper pin portion has a tapered surface 112 engageable with a companion internally tapered surface 113 on the box 10, the upper pin portion 17 having its terminal pin surface 18 normal to the axis of the connector which engages the companion shoulder 13 provided on the box.

As in the other forms of the invention, the upper end of the box 10 is suitably secured to an upper conduit section 22 by a suitable weld 23, the lower end of the pin 11 being suitably secured to a lower adapter or pipe section 24 by a weld 25, both welds being circumferentially continuous. As in the other forms of the invention the box and pin have longitudinally spaced upper and lower horizontal flanges 26 to which one or more choke kill lines (not shown) may extend along the exterior of the marine riser.

Located between the upper end of the threaded ring 40d and an upward and outwardly inclined pin shoulder 34a is a circumferentially continuously spacer ring 115 which bears against the upper end 116 of the threaded ring. This spacer ring, in turn, supporting or bears against the lower end 117 of a segmental spacer ring 32d which tapers in an upward and inward direction, as shown in FIG. 7. The spacer ring 115 is interconnected to the threaded ring 40d by a lower split retainer ring 118 having spaced inwardly directed flanges 119 disposed in companion external grooves 120 in the threaded ring and the spacer ring to prevent any material longitudinal separation between the parts when the connector is being assembled. A split retainer ring 118a similarly interconnects the ring 115 and the segmental spacer ring 32d.

The segmental spacer ring 32d consists of separate segments 121. They are circumferentially adjacent to one another, being urged outwardly to an expanded diameter by helical springs 122 received in bores 123 in one side of each segment, there being centering or locator pins 124 mounted in sockets 125 in the opposite side of such segment which bear against the springs in an adjacent segment so that the ring segments 121, when contracted to a smaller collective diameter, 122, which will compress the springs tend to separate the segments from one another and enlarge the diameter of the ring 32d. It is to be noted that each of the segments 121 is tapered in an upward direction as disclosed in FIG. 10, which permits the segments to tilt inwardly about their lower ends to a generally frustoconical form, with the lower or large end of the segments engaging the spacer ring 115 and with the upper or smaller end of the ring bearing against the tapered surface 34a on the upper pin portion 17 of the pin 11.

It assembling the connector, the segments 121 are disposed with their sides adjacent to one another and the split retainer ring 118a connecting the segmental ring 32d to the spacer ring 115. The segments initially occupy a position in which their upper ends are disposed outwardly from the position illustrated in FIG. 7, the inside diameter of the segmental spacer ring then being greater than the outside diameter of the pin 11. The assembled segmental ring 32d with the spacer ring 115 attached thereto and with the spacer ring connected to the threaded ring 40d by the lower split retainer ring 118 is then inserted into the box and rotated to engage at least one external thread 101 with the box thread 100. At this time, the upper end of the segmental ring 32d is disposed below an internal tapered surface 130 of the box 10. The box is then stabbed over the pin to carry the rings 40d, 115, 32d over the upper pin portion 17 and place the expanded ring 32d into a position below the tapered surface 34a of the pin. The threaded ring 40d is then rotated to feed upwardly of the box, the spacer ring 115 and the segmental spacer ring 32d being prevented from turning under the influence of the threaded ring because of the provision of a key 131 fitting in opposed grooves 132 in the box and in the spacer ring, as shown in FIG. 8, to provide a slidable spline connection between the rings. As the ring 40d threads upwardly within the box, the spacer ring 115 and segments 121 are also shifted upwardly therein, the ends of the segments 121 engaging the tapered box surface 130, which pivots them inwardly to a position under the downwardly facing tapered surface 34a of the pin. The rotation of the threaded ring 40d continues to feed it longitudinally upwardly and transmit its upward motion and thrust through the segmental spacer ring 32d to the tapered pin shoulder 34a, the upper ends of the segments being prevented from shifting outwardly by disengagement of their upper, outer surfaces 135 with an encompassing internal surface 136 in the box.

After the threaded ring 40d has been moved upwardly sufficiently to tighten the parts against one another, a suitable tool can then be placed between the reaction surfaces 103, 104 provided on the ring 40d and the box 10 to apply a predetermined torque to the threaded ring 40d which will compress the threaded ring, spacer ring 115 and segment ring 32d against one another, with the upper ends of the segments being compressed against the tapered pin surface 34a, and with the upper end 113 of the pin compressed against the box shoulder 13 with a predetermined pre-load.

Because of the use of the circumferentially continuous threaded ring 40d, the load is transmitted to the spacer ring 115 over circumferentially continuous contacting surfaces, such load also being transmitted over a substantial circumferential extent to the segmental spacer ring 32d, and from the segmental spacer ring to the downwardly facing tapered shoulder 34a of the pin, in order to exert the desired thrust between the upper end 18 of the pin and box shoulder 13 over the full 360° of contact between the pin and box. As the load on the marine riser sections increases with increased depth, the larger tensile loads imposed on each connector by the marine riser cannot effect loosening of the connector, inasmuch as the pre-load of the contacting pin end 18 and shoulder 13 under compression more than offsets the large applied tensile loads.

I claim:

1. A connector for pipe subjecting the connector to high tensile and bending forces comprising a rigid metallic tubular pin having a first transverse thrust surface at one extremity, a rigid metallic tubular box telescopically disposed over said pin and having a transverse shoulder abutting said first thrust surface, said box and pin having inner and outer wall portions, respectively, spaced laterally from each other to provide an annular space therebetween, lock means on said box shiftable laterally thereof, rigid metallic thrust transmitting means in said annular space, said thrust transmitting means having a second transverse surface engaging a third transverse surface on said pin, first cam means on said thrust transmitting means engaging second cam means on said lock means, and means for shifting said lock means laterally toward said pin to force said second cam means against said first cam means to force said second transverse surface against said third transverse surface and urge said pin axially toward said shoulder to force said first transverse surface against said transverse shoulder to axially pre-load said pin and box for resisting axial separation of said first transverse surface and said shoulder under high tensile forces; and said connector having coengaged laterally opposed circumferentially extended wall means spaced from said first transverse surface and said transverse shoulder for resisting bending of the connector.

2. A connector as defined in claim 1; said first and second cam means comprising coengageable tapered surfaces on said thrust transmitting means and said lock means.

3. A connector as defined in claim 1; said lock means comprising a plurality of circumferentially spaced lock members, said first and second cam means comprising tapered surfaces on said thrust transmitting means and lock members.

4. A connector as defined in claim 1; said thrust transmitting means comprising rigid spacer ring means disposed in said annular space, said second transverse surface being on one extremity of said ring means, said first cam means being on the other extremity of said ring means.

5. A connector as defined in claim 1; said thrust transmitting means comprising rigid spacer ring means disposed in said annular space, said second transverse surface being on one extremity of said ring means, said first cam means being on the other extremity of said ring means, said lock means comprising a plurality of circumferentially spaced lock members, said first and second cam means comprising tapered surfaces on said other extremity of said ring means and on said lock members.

6. A connector as defined in claim 1; said thrust transmitting means comprising spacer ring means disposed in said annular space, said second transverse surface being on one extremity of said ring means, said first cam means being on the other extremity of said ring means, said first thrust surface and shoulder having a circumferential extent of substantially 360°, said second and third transverse surfaces each having a circumferential extent of substantially 360°.

7. A connector as defined in claim 1; said thrust transmitting means comprising spacer ring means disposed in said annular space, said second transverse surface being on one extremity of said ring means, said first cam means being on the other extremity of said ring means, said first thrust surface and shoulder having a circumferential extent of substantially 360°; said second and third transverse surfaces each having a cirumferential extent of substantially 360°, said lock means comprising a plurality of circumferentially spaced lock members, said first and second cam means comprising tapered surfaces on said other extremity of said ring means and on said lock members.

8. A connector as defined in claim 1; said thrust transmitting means comprising spacer ring means disposed in said annular space, said second transverse surface being on one extremity of said ring means, said first cam means being on the other extremity of said ring means, said ring means comprising a split spacer ring having said second transverse surface thereon and a circumferentially continuous load ring engaging said spacer ring and having said first cam means thereon.

9. A connector as defined in claim 1; said thrust transmitting means comprising spacer ring means disposed in said annular space, said second transverse surface being on one extremity of said ring means, said first cam means being on the other extremity of said ring means, said ring means comprising a split spacer ring having said second transverse surface thereon and a circumferentially continuous load ring engaging said spacer ring and having said first cam means thereon, said lock means comprising a plurality of circumferentially spaced lock members, said first and second cam means comprising coengageable tapered surfaces on said load ring and on said lock members.

10. A connector as defined in claim 1; said box having a skirt surrounding said pin, said wall means including an inner wall on said skirt engaging a confronting external wall of said pin at longitudinally spaced locations to transmit bending forces between said pin and box to substantially prevent such bending forces from being transmitted through said lock means.

11. A connector as defined in claim 1; said box having a skirt surrounding said pin, said wall means including an inner wall on said skirt engaging a confronting external wall of said pin at longitudinally spaced locations to transmit bending forces between said pin and box to substantially prevent such bending forces from being transmitted through said lock means, one of said locations being at the outer end of said pin at one side of said lock means, another of said locations being at the outer end portion of said box at the opposite side of said lock means.

12. A connector as defined in claim 1; said thrust transmitting means comprising spacer ring means disposed in said annular space, said second transverse surface being on one extremity of said ring means, said first cam means being on the other extremity of said ring means, said ring means comprising a split spacer ring having said second transverse surface thereon and a circumferentially continuous load ring engaging said spacer ring and having said first cam means thereon, said box having a skirt surrounding said pin, said wall means including an inner wall on said skirt engaging an external wall at the outer end portion of said pin, the outer periphery of said load ring engaging said inner wall, the inner periphery of said load ring engaging said external wall.

13. A connector as defined in claim 1; said thrust transmitting means comprising spacer ring means disposed in said annular space, said second transverse surface being on one extremity of said ring means, said first cam means being on the other extremity of said ring means, said ring means comprising a split spacer ring having said second transverse surface thereon and a circumferentially continuous load ring engaging said spacer ring and having said first cam means thereon, said box having a skirt surrounding said pin, said wall means including an inner wall on said skirt engaging an external wall at the outer end portion of said pin, the outer periphery of said load ring engaging said inner wall, the inner periphery of said load ring engaging said external wall, the outer end portion of said box engaging said external wall.

14. A connector for pipe subjecting the connector to high tensile and bending forces comprising a rigid metallic tubular pin having a first transverse thrust surface at one extremity, a rigid metallic tubular box telescopically disposed over said pin and having a transverse shoulder abutting said first thrust surface, said box and pin having inner and outer wall portions, respectively, spaced laterally from each other to provide an annular space therebetween, rigid thrust means on said box shiftable with respect thereto, rigid metallic thrust transmitting means in said annular space, said thrust transmitting means having a second transverse surface engaging a third transverse surface on said pin, and means for shifting said thrust means relative to said pin to force said thrust transmitting means axially toward said third transverse surface to correspondingly force said second transverse surface against said third transverse surface and urge said pin axially toward said shoulder and thereby force said first transverse surface against said transverse shoulder to axially preload said pin and box for resisting axial separation of said first transverse surface and said shoulder under high tensile forces; and said connector having coengaged laterally opposed circumferentially extended wall means spaced from said first transverse surface and said transverse shoulder for resisting bending of the connector.

15. A connector as defined in claim 14; said thrust means comprising an actuator ring on said box engaging said thrust transmitting means, said shifting means comprising a threaded connection between said actuator ring and box.

16. A connector as defined in claim 14; said thrust transmitting means including a split spacer ring having said second transverse surface.

17. A connector as defined in claim 14; said thrust transmitting means including a split spacer ring having said second transverse surface, and a circumferentially continuous spacer ring engaging an end of said split spacer ring remote from said second transverse surface.

18. A connector as defined in claim 16; said split spacer ring including a plurality of separate segments, and means urging said segments apart.

19. A connector as defined in claim 17; said split spacer ring including a plurality of separate segments, and means urging said segments apart.

20. A connector as defined in claim 17; said thrust means comprising an actuator ring on said box engaging said circumferentially continuous spacer ring, said shifting means comprising a threaded connection between said actuator ring and box.

21. A connector as defined in claim 19; said thrust means comprising an actuator ring on said box engaging said circumferentially continuous spacer ring, said shifting means comprising a threaded connection between said actuator ring and box.

22. A connector as defined in claim 14; said wall means including walls on said pin and on said box coengaged at axially spaced locations.

23. A connector as defined in claim 14; said wall means including walls on said pin and on said box at one location adjacent to said first transverse surface and said transverse shoulder and at another location spaced axially substantially from said first location.

* * * * *